April 12, 1938. J. BALTON 2,114,205
ICE CREAM CONE
Filed Nov. 20, 1936
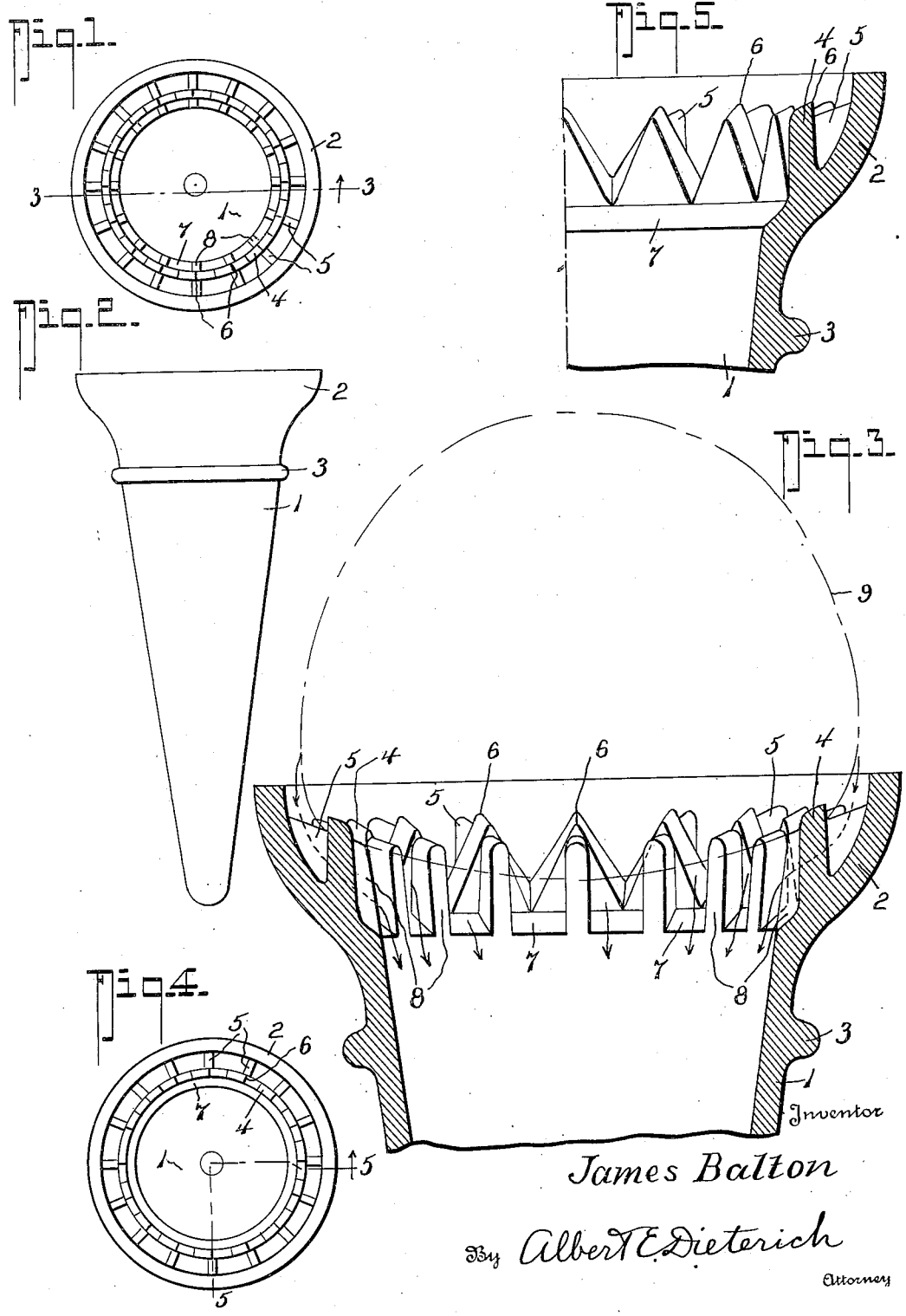
Inventor
James Balton
By Albert E. Dieterich
Attorney Patented Apr. 12, 1938

2,114,205

UNITED STATES PATENT OFFICE 2,114,205

ICE CREAM CONE

James Balton, Baltimore, Md., assignor of one-fourth to Joseph Shapiro, Baltimore, Md., one-fourth to Isaac Shapiro, Chicago, Ill., one-fourth to Nathan Shapiro, and one-fourth to Samuel Shapiro, both of Chelsea, Mass.

Application November 20, 1936, Serial No. 111,954

5 Claims. (Cl. 99—89)

My invention, which relates to the art of cup pastry, has special reference to ice cream cones. For years it has been the practice to provide the ice cream cone dispenser with a hemispherical dipper by means of which a ball of ice cream is formed, the ball being then transferred from the dipper to the cone and pressed down into the mouth of the cone as it is released from the dipper.

The present invention provides a special construction of cone, with provisions to receive the ball of cream (especially of hard cream) and hold it away from the mouth or rim edge of the cone when first placed in the cone so that meltings of the cream may pass down into the stem of the cone without slopping over the mouth edge.

A further object of the invention is to provide a cone with teeth to engage the ball of cream and ribs temporarily to hold the ball from seating too deeply, so that a flavoring syrup may be poured over the ball and run down the stem and be prevented from slopping over the outside of the bowl of the cone.

The present invention also has for its object to improve and render more practical and less expensive other cones used for somewhat similar purposes, such, for example, as those of Patents Nos. 1,654,825, 1,783,798, 1,894,545 and 1,938,113.

Other objects will in part be obvious and in part be pointed out hereinafter.

To the attainment of the aforesaid objects and ends the invention still further resides in the novel details of construction, combination and arrangement of parts, all of which will be first fully described in the following detailed description and then be particularly pointed out in the appended claims, reference being had to the accompanying drawing in which:

Figure 1 is a top plan view of a cone embodying the invention.

Figure 2 is an elevation thereof.

Figure 3 is an enlarged detail section on the line 3—3 of Figure 1.

Figure 4 is a top plan view of the cone with the inner radial ribs omitted.

Figure 5 is an enlarged detail section on the line 5—5 of Figure 4.

In the drawing, in which like numerals and letters of reference indicate like parts in all the figures, 1 is the stem of the cone, 2 the bowl, and 3 the nesting ring. The bowl 2 and stem 1 are preferably of approximately the same wall thickness, although if desired the mouth edge may be reinforced by a mouth ring. As such method of reinforcement is old and well known, and constitutes no part of the present invention, illustration and detailed description of the same seems to be unnecessary.

Within the bowl 2 is an annular series of teeth 4 pointed at 6, easily to bite into the ball of cream 9 when placed over the teeth (see Figure 3). The teeth 4 may extend above the rim mouth of the bowl or terminate below the same, the latter being the preferred arrangement, as illustrated in the accompanying drawing. The teeth 4 are preferably set outwardly from the inner wall of the stem instead of in alignment with the same so as to leave a slight inclined shelf 7.

In order to brace the teeth 4 a set of radial ribs 5 connect the teeth with the wall of the bowl 2, and auxiliary ribs 8, which may in effect be continuations of ribs 5 may be provided if desired (see Figures 1 and 2). The tops of the ribs 5 (and 8, if they are present) lie at a common level which is below that of the upper ends of the teeth 4 so that they may serve as rests for the ball of ice cream 9 that has been impaled on the points 6 of the teeth 4 (see dot and dash lines of Figure 3).

If a ball of hard-frozen ice cream 9 is pressed upon the teeth 4 it will come to rest on the ribs 5 and thereby will be held from sealing the outlet from stem 1.

A further purpose of the teeth 4 is to constitute a rest for the nesting ring 3 when several cones are nested together, the ring 3 of one cone resting on the teeth 4 of the cone below, thus holding the walls of the stems of nested cones from wedging contact and providing an air circulation via the space between adjacent teeth, between the interior of the stem 1 and the outside of the cone at the mouth rim. This keeps the cones dry when packed for shipment.

From the foregoing description, taken in connection with the accompanying drawing, it is thought that the invention and its advantages will be clear to those skilled in the art.

What I claim is:

1. In an ice cream cone, a bowl and a stem, an annular series of connected teeth formed in the bowl and having their points projecting upwardly, radial ribs connecting said teeth to the wall of the bowl, and a second set of radial ribs connecting the teeth with the wall of the cone at the top of the stem, said teeth being spaced outwardly from the inner diameter of the top of the stem to leave an upwardly inclined shelf between each pair of second-set ribs.

2. In an ice cream cone, a bowl and a stem, an annular series of inverted V-shaped teeth connected together at their bases and having their points projecting upwardly, and radial ribs connecting said teeth to the wall of the bowl.

3. In an ice cream cone, a bowl and a stem, an annular series of inverted V-shaped teeth connected together at their bases and having their points projecting upwardly, and radial ribs connecting said teeth to the wall of the bowl, the tops of said teeth lying in a plane below the level of the mouth of the bowl of the cone.

4. In an ice cream cone, a bowl and a stem, an annular series of inverted V-shaped teeth connected together at their bases and having their points projecting upwardly, radial ribs connecting said teeth to the wall of the bowl, the tops of the ribs being located at a lower level than the points of the teeth, and a second set of radial ribs connecting the teeth with the wall of the cone at the top of the stem, the tops of said ribs being inclined downwardly toward the central longitudinal axis of the cone.

5. In an ice cream cone, a bowl and a stem, an annular series of inverted V-shaped teeth connected together at their bases and having their points projecting upwardly, radial ribs connecting said teeth to the wall of the bowl, the tops of said teeth lying in a plane below the level of the mouth of the bowl of the cone, a nesting ring on the outside of said stem adjacent the bowl, the diameter of the nesting ring being such that when two cones are nested together the ring of the top cone will lie within the bowl of the lower cone and be supported on the tops of the teeth thereof.

JAMES BALTON.